(12) United States Patent
Kunder et al.

(10) Patent No.: US 6,841,195 B2
(45) Date of Patent: Jan. 11, 2005

(54) PROCESS FOR CORROSION PROTECTION OF TURBINE INTERNAL COMPONENTS

(75) Inventors: George Anthony Kunder, Taylors, SC (US); James Elliott Holden, Midlothian, VA (US)

(73) Assignee: General Electric Company, Schenectady, NY (US)

( * ) Notice: Subject to any disclaimer, the term of this patent is extended or adjusted under 35 U.S.C. 154(b) by 156 days.

(21) Appl. No.: 10/321,442

(22) Filed: Dec. 18, 2002

(65) Prior Publication Data

US 2004/0118341 A1 Jun. 24, 2004

(51) Int. Cl.[7] ................................................ B05D 7/22
(52) U.S. Cl. ........................ 427/237; 427/238; 118/317
(58) Field of Search ................................ 427/230, 237, 427/238, 248.1; 118/317, 715

(56) References Cited

U.S. PATENT DOCUMENTS 4,148,275 A * 4/1979 Benden et al. .............. 118/715
6,273,678 B1 * 8/2001 Darolia ....................... 415/200

* cited by examiner

*Primary Examiner*—Shrive P. Beck
*Assistant Examiner*—William Phillip Fletcher, III
(74) *Attorney, Agent, or Firm*—Nixon & Vanderhye P.C.

(57) ABSTRACT

A method and system of applying a corrosion inhibitor to the interior component parts of a turbine to provide corrosion protection to the components is disclosed. A blower connected to the turbine introduces air into the turbine's interior. A fog of corrosion inhibitor is added to the air and introduced into the turbine through at least one inlet vent in the turbine for introducing the air from the blower into the turbine's interior, and introducing the corrosion inhibitor into the inlet vent while the blower is operating so that the corrosion inhibitor is caused to be drawn into and through the interior of the turbine to coat the interior component parts of the turbine. The step of introducing the corrosion inhibitor into the inlet vent is performed until the corrosion inhibitor appears at the outlet vent at the opposite end of the turbine from where the inlet vent is located or until the corrosion inhibitor coats all exposed surfaces of the components inside turbine. All openings in turbine are subsequently sealed to contain the corrosion inhibitor inside the turbine.

27 Claims, 3 Drawing Sheets

PROCESS FOR CORROSION PROTECTION OF TURBINE INTERNAL COMPONENTS

BACKGROUND OF THE INVENTION

The present invention relates to corrosion protection for gas and steam turbine components, and in particular, to a process for providing corrosion protection for the internal components of a gas or steam turbine in the hot gas or steam flow path.

Gas and steam turbines typically include components with parts that are made from iron. These parts typically include the internal bores of the casings, the rotor blades and spacers, combustion hardware and rotor bolting. These parts are critical components on gas and stream turbines from a functional and performance standpoint. Typically, after a turbine has been assembled and tested, it is shipped to a location where it is either installed or stored for later installation. Often, during the time between a turbine leaving a manufacturing facility and its subsequent installation and startup at a power plant, the components of the turbine that include iron parts will rust. The development of rust on such component parts can significantly compromise the performance of the turbine. The rust can change the turbine's airfoil profile and thereby affect performance. Rust can also block up cooling holes and orifices. The presence of rust on a new turbine can also affect a customer's perception of the quality of the turbine being delivered and the ability of the turbine's manufacturer to deliver a satisfactory product.

There have been prior efforts to solve the problem of rust forming on iron turbine component parts. One method currently used to protect turbine components from the formation of rust involves stuffing paper impregnated with volatile corrosion inhibitors ("VCI") into the inlet and exhaust cavities of the turbine to seal the cavities. VCI paper can help mitigate the beginning of corrosion, but must be kept dry. The problem with this method is that it provides corrosion protection only in the areas where the VCI paper is used.

Another method currently used involves installing a closed loop dehumidification system in the turbine to direct warm, dry air over the turbine's iron component parts. However, the effectiveness of this method is limited since it provides protection only to those turbine components directly in the flow path of the warm, dry air directed through the turbine by the dehumidification system. It does not protect any components that are not directly in the flow path of the warm, dry air. Thus, it would be desirable to provide a method of providing corrosion protection to all exposed surfaces of components inside the flow path of a turbine, such as casing walls and cavities, buckets, blades, nozzles, veins, shafts, seals, combustors and cooling passages.

BRIEF DESCRIPTION OF THE INVENTION

In an exemplary embodiment of the invention, a method of applying a corrosion inhibitor to the interior component parts of a turbine to provide corrosion protection to the components comprises the steps of introducing a stream of air into the turbine's interior, introducing a fog of the corrosion inhibitor into the stream of air entering the turbine so that the corrosion inhibitor is caused to be drawn into and through the interior of the turbine to coat the interior component parts of the turbine, continuing to introduce the fog of corrosion inhibitor into the stream of air being introduced into the turbine's interior until the fog of corrosion inhibitor is exhausted from the turbine, and subsequently sealing all openings in the turbine with a cover to contain the corrosion inhibitor inside the turbine.

In another exemplary embodiment of the invention, a method of applying a corrosion inhibitor to the interior component parts of a turbine to provide corrosion protection to the components comprises the steps of providing a blower connected to the turbine for introducing air into the turbine's interior, providing a first vent in the turbine for introducing the air into the turbine's interior, providing a second vent in the turbine at the opposite end of turbine from the first vent for exhausting air from the turbine's interior, introducing a fog of the corrosion inhibitor into the air entering the first vent while the blower is operating so that the corrosion inhibitor is caused to be drawn into and through the interior of the turbine to coat the interior component parts of the turbine, continuing to introduce the corrosion inhibitor into the first vent until the fog of corrosion inhibitor appears at the second vent, and subsequently sealing all openings in the turbine with a cover to contain the corrosion inhibitor inside the turbine.

In yet another exemplary embodiment of the invention, a method of applying a corrosion inhibitor to the interior component parts of a turbine to provide corrosion protection to the components comprises the steps of providing a blower connected to the turbine for forcing or drawing air into the turbine's interior, providing at least one inlet vent in the turbine for introducing air into the turbine's interior, providing a volume of corrosion inhibitor in a pressurized container that is connected to the at least one inlet vent, providing at least one outlet vent in the turbine at the opposite end of turbine from the at least one inlet vent for exhausting air from the turbine's interior, introducing a fog of the corrosion inhibitor into the air entering the at least one inlet vent while the blower is operating so that the corrosion inhibitor is caused to be drawn into and through the interior of the turbine to coat the interior component parts of the turbine, continuing to introduce the corrosion inhibitor into the at least one inlet vent until the fog of corrosion inhibitor appears at the at least one outlet vent, and subsequently sealing all openings in the turbine with a cover to contain the corrosion inhibitor inside the turbine.

In a further exemplary embodiment of the invention, a system for applying a corrosion inhibitor to the interior component parts of a turbine to provide corrosion protection to the components comprises a blower for producing a stream of air, a first vent in the turbine for introducing the stream of air into the turbine's interior, a second vent in the turbine for exhausting the air from the turbine's interior, a pressurized container of corrosion inhibitor that is connected to the at least one inlet vent and that introduces a fog of the corrosion inhibitor into the stream of air entering the first vent while the blower is operating so that the corrosion inhibitor is caused to be introduced into and through the interior of the turbine to coat the interior component parts of the turbine, a valve on the pressurized container for discontinuing the introduction of the fog of corrosion inhibitor into the first vent when the corrosion inhibitor is exhausted from the second vent, and at least one cover for subsequently sealing all openings in the turbine to contain the corrosion inhibitor inside the turbine.

In yet a further exemplary embodiment of the invention, a system for applying a corrosion inhibitor to the interior component parts of a turbine to provide corrosion protection to the components comprises means for introducing a stream of air into the turbine's interior, means for introducing a fog of the corrosion inhibitor into the stream of air entering the turbine so that the corrosion inhibitor is caused to be drawn into and through the interior of the turbine to coat the interior component parts of the turbine, means for discontinuing the introduction of the fog of corrosion inhibitor into the stream of air being introduced into the turbine's interior when the fog of corrosion inhibitor is exhausted from the turbine, and means for subsequently sealing all openings in the turbine to contain the corrosion inhibitor inside the turbine.

BRIEF DESCRIPTION OF THE DRAWINGS

The advantages of the present invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
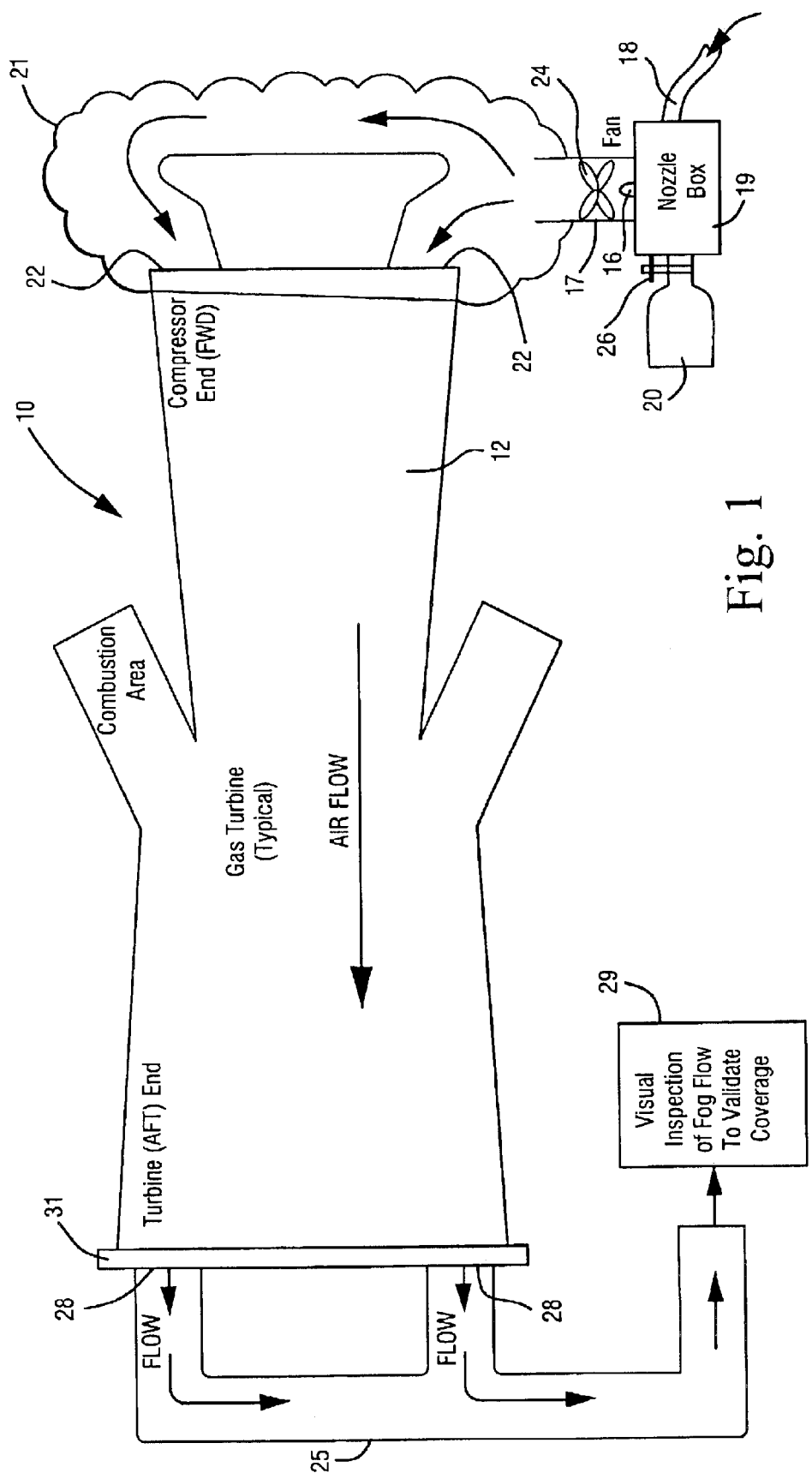
FIG. 1 is a schematic diagram illustrating the method of the present invention wherein a blower connected to a tarp that covers the inlets of a gas or steam turbine forces a fog of corrosion inhibitor into the interior of the turbine so that the corrosion inhibitor coats the internal components of the turbine.

FIG. 1 illustrates an exemplary embodiment of the method according to the present invention for applying corrosion inhibitor to the interior component parts of a gas (or steam) turbine 10 to provide corrosion protection to the exposed surfaces of turbine 10's internal components. According to the method of the present invention, a selected volume of corrosion inhibitor, such as a VCI product, is introduced into the interior 12 of turbine 10. The preferred corrosion inhibitor product is Cortec's 337 VCI product.

The corrosion inhibitor can be introduced into interior 12 of turbine 10 in more than one way. One preferred method is to use a pressurized container 20 of the corrosion inhibitor that is vented to a nozzle box 19, as shown in FIG. 1. Inside nozzle box 19, the corrosion inhibitor is mixed with a high pressure air stream fed into box 19 through a high pressure air hose 18. This mixture of air and corrosion inhibitor is then vented from nozzle box 19 through an atomizing nozzle 16 into a high pressure motor driven blower 24. A portion of a PVC pipe 17 containing blower 24 and extending from nozzle box 19 is inserted into a tarp 21 that covers and provides an air-tight seal around the air inlet vents 22 of turbine 10.

Atomizing nozzle 16 produces a fog of the corrosion inhibitor that is then forced by blower 24 into turbine 10 through inlet vents 22. Once the corrosion inhibitor is forced into and through the interior 12 of turbine 10, it coats substantially all of the exposed surfaces of the iron components inside turbine 10 that are in the flow path of the air stream generated by blower 24. The corrosion inhibitor is forced into turbine 10 by blower 24 while turbine 10 is not operating.

Preferably, container 20 includes a valve 26 for controlling the flow of the corrosion inhibitor from container 20 into nozzle box 19. Preferably, tarp 21 is a heavy duty "foreign object damage" ("FOD") type of tarp that is typically used to protect newly manufactured turbines. To accommodate the insertion of PVC pipe 17, preferably tarp 21 can be modified to include a velcro hatch door through which pipe 17 can extend into tarp 21.

Figure 2:
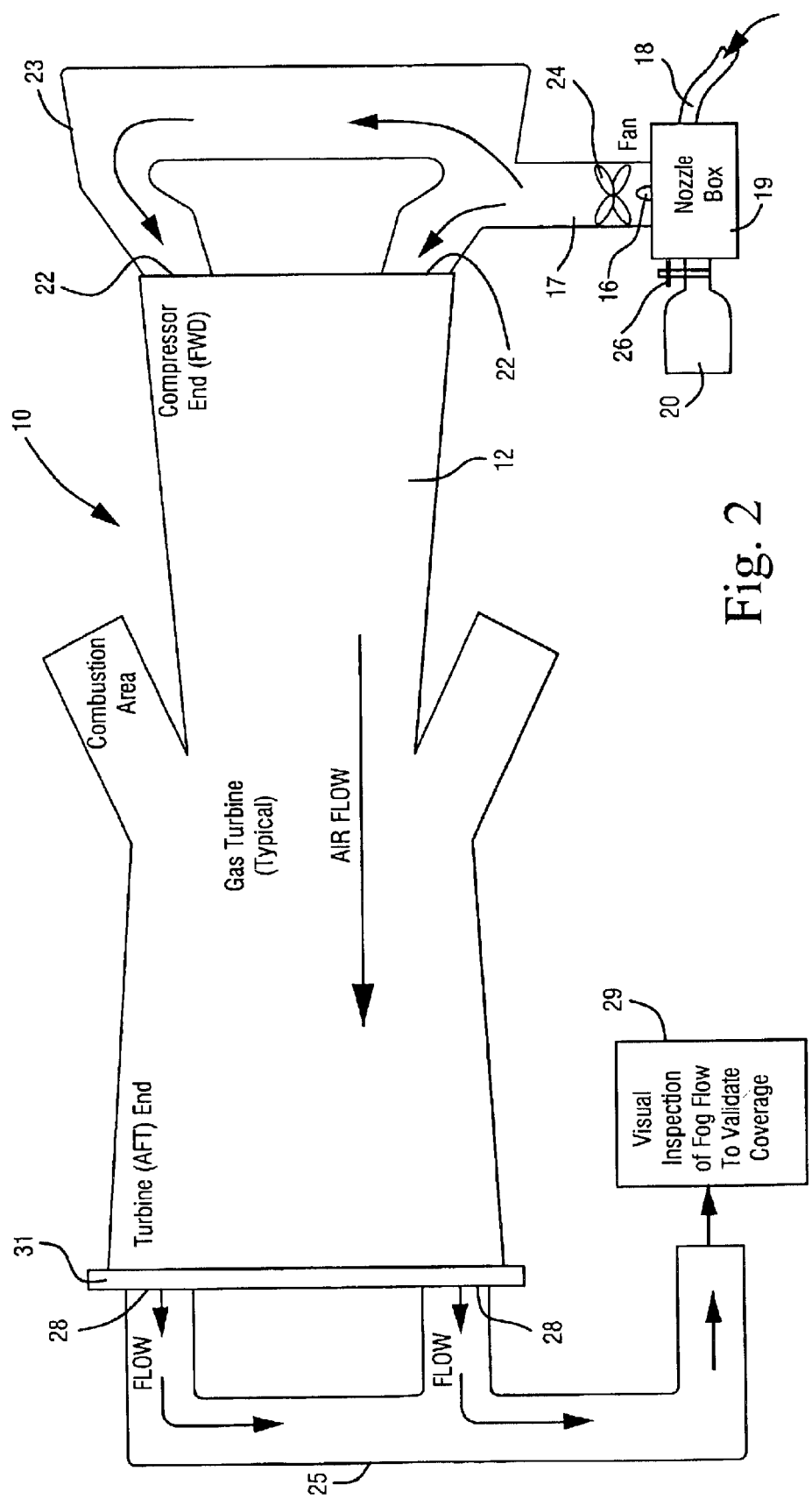
FIG. 2 is a schematic diagram illustrating the method of the present invention wherein a blower connected to a housing that covers the inlets of a gas or steam turbine forces corrosion inhibitor into the interior of the turbine so that the corrosion inhibitor coats the internal components of the turbine.

FIG. 2 shows an alternative preferred method of introducing the corrosion inhibitor into interior 12 of turbine 10. The method shown in FIG. 2 is identical to the method shown in FIG. 1, except that a hard shell housing 23 that covers air inlet vents 22 of turbine 10 replaces tarp 21 shown in FIG. 1. Thus, PVC pipe 17 extending nozzle box 19 is inserted in an opening in housing 23 so that blower 24 within pipe 17 causes a fog of the corrosion inhibitor to be forced into and through the interior 12 of turbine 10 so that it coats all of the exposed surfaces of the iron components inside turbine 10 that are in the air flow path of blower 24. This is again done while turbine 10 is not operational.

Figure 3:
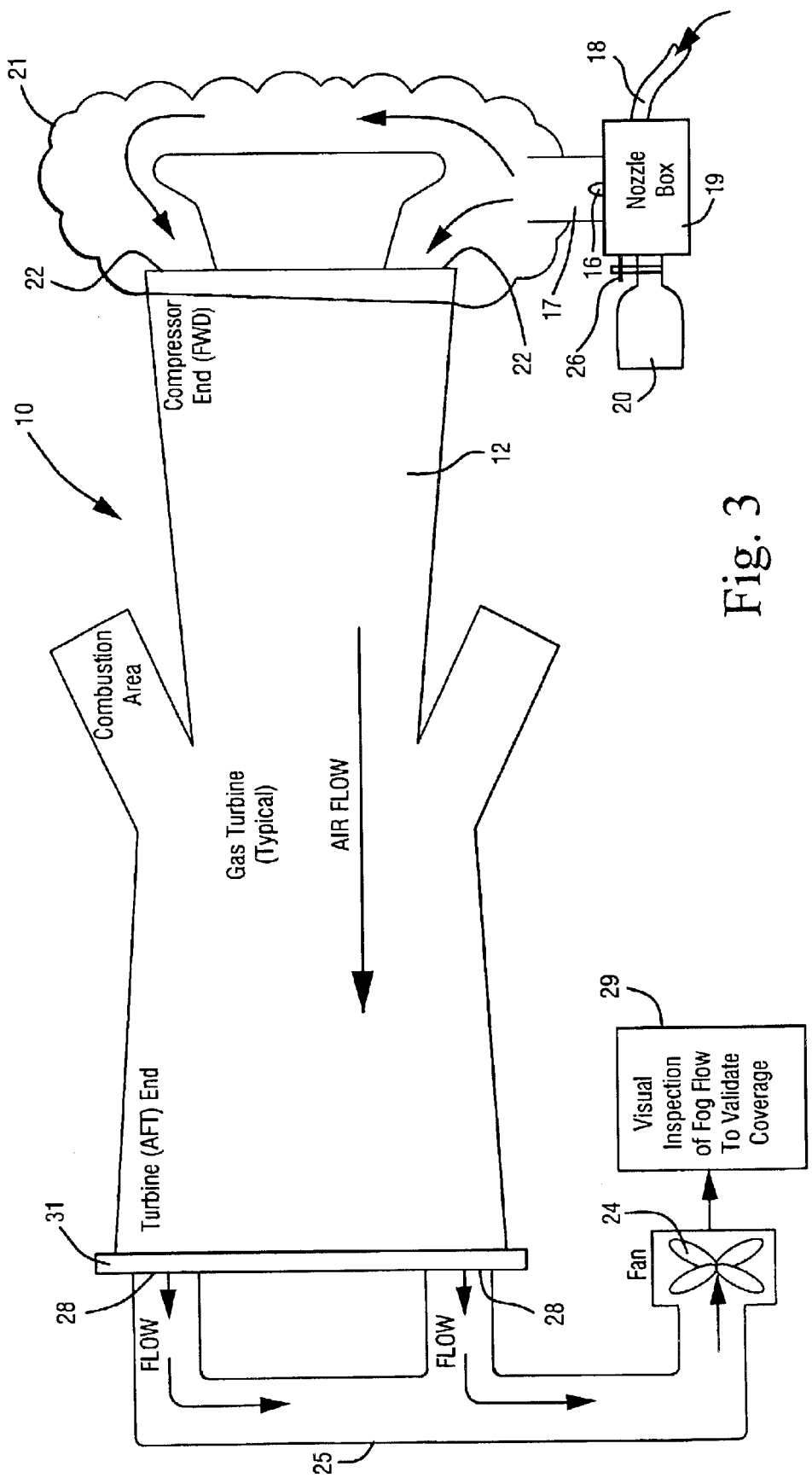
FIG. 3 is a schematic diagram illustrating the method of the present invention wherein a blower connected to a pipe that is also connected to the outlets of the turbine causes corrosion inhibitor to be drawn into the interior of a gas or steam turbine so that the inhibitor coats the internal components of the turbine.

FIG. 3 shows yet another alternative preferred embodiment of the invention for introducing the corrosion inhibitor into the interior 12 of turbine 10 in which blower 24 is connected to the air outlets 28 of turbine 10 through a pipe 25. In the method of FIG. 3, blower 24 causes a fog of the corrosion inhibitor to be drawn from atomizing nozzle 16 of nozzle box 19 into the air inlets 22 of turbine 10 and through the interior 12 of turbine 10 so that it coats all of the exposed surfaces of the iron components inside turbine 10. Pipe 25 protrudes from a corrugated plastic seal 31 placed over the outlet of turbine 10.

In the method of FIG. 3, container 20 is again connected to nozzle box 19 and PVC tube 17 extending from nozzle box 19 is again inserted into tarp 21 which covers air inlet vents 22 of turbine 10. Within tube 17 is atomizing nozzle 16 that produces the fog of the corrosion inhibitor drawn into the air inlets 22 of turbine 10 by blower 24.

Whether the corrosion inhibitor is introduced into the interior 12 of turbine 10 by blower 24 through inlets vents 22 or through outlet vents 28, a determination is made as to whether a sufficient amount of corrosion inhibitor has been introduced by noting the presence of a fog mist 29 of the corrosion inhibitor at the air outlet vents 28 at the opposite end of turbine 10 from where the fog of inhibitor is introduced. In addition, the amount of corrosion inhibitor to be used is also dependent upon the exposed surface area to be coated and the desired length of corrosion protection. The greater the exposed surface area to be coated and/or the greater length of time to provide corrosion protection, the greater the volume of corrosion inhibitor must be introduced into turbine 10.

Once the desired amount of corrosion inhibitor has been deposited on the exposed surfaces of the interior components of turbine 10, all openings in turbine 10's exterior are sealed with covers, such as the plastic cover 31, shown in FIGS. 1–3, to contain the corrosion inhibitor in the inside of turbine 10. The covers can consist of metal, plastic or tape or a combination of one or more of the foregoing, depending on the openings to be covered and the availability or desirability of a particular type of cover to be used. Once the introduction of the corrosion inhibitor to the interior of a turbine has been completed, the standard or current coating end of preservation process to protect the exterior surfaces of turbine 10 would then be performed. Typically, this process involves painting the exterior surfaces of the turbine and covering the turbine with shrink tarp.

The method of the present invention for applying corrosion inhibitor to the interior of gas and steam turbines after final assembly and the test to prevent corrosion of internal hardware during shipping and storage and prior to initial startup can also be used during any extended shutdown of the turbine. In that situation, the corrosion inhibitor would again be introduced to the inlet of turbine 10 through either the inlets 22 or outlets 28 of the turbine in a manner so as to force or draw the corrosion inhibitor completely through the interior of the turbine.

The method of the present invention can also be used to protect the internal components of gears, pumps, compressors and other equipment requiring corrosion protection between final assembly and/or test and startup.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of applying a corrosion inhibitor to the interior component parts of a turbine to provide corrosion protection to the components, the method comprising the steps of:
   introducing a stream of air into the turbine's interior,
   introducing a fog of the corrosion inhibitor into the stream of air entering the turbine so that the corrosion inhibitor is caused to be drawn into and through the interior of the turbine to coat the interior component parts of the turbine,
   continuing to introduce the fog of corrosion inhibitor into the stream of air being introduced into the turbine's interior until the fog of corrosion inhibitor is exhausted from the turbine, and
   subsequently sealing each opening in the turbine with a cover to contain the corrosion inhibitor inside the turbine.

2. The method of claim 1 wherein the fog of corrosion inhibitor is provided from a pressurized container of the corrosion inhibitor.

3. The method of claim 1 wherein the corrosion inhibitor is a volatile corrosion inhibitor product.

4. The method of claim 1 wherein the step of introducing the corrosion inhibitor into the interior of the turbine is performed until the corrosion inhibitor coats substantially all exposed surfaces of the components inside the turbine.

5. The method of claim 1 wherein each cover is made from a material selected from the group consisting of plastic, metal and tape.

6. The method of claim 1 wherein the turbine includes a plurality of openings covered by a plurality of covers, and wherein the covers are made from a combination of materials selected from the group consisting of plastic, metal and tape.

7. A method of applying a corrosion inhibitor to the interior component parts of a turbine to provide corrosion protection to the components, the method comprising the steps of:
   providing a blower connected to the turbine for introducing air into the turbine's interior,
   providing a first vent in the turbine for introducing the air into the turbine's interior,
   providing a second vent in the turbine at the opposite end of turbine from the first vent for exhausting air from the turbine's interior,
   introducing a fog of the corrosion inhibitor into the air entering the first vent while the blower is operating so that the corrosion inhibitor is caused to be drawn into and through the interior of the turbine to coat the interior component parts of the turbine,
   continuing to introduce the corrosion inhibitor into the first vent until the fog of corrosion inhibitor appears at the second vent, and
   subsequently sealing all openings in the turbine with a plurality of covers to contain the corrosion inhibitor inside the turbine.

8. The method of claim 7 wherein the fog of corrosion inhibitor is provided from a volume of corrosion inhibitor in a pressurized container that is connected to the first vent.

9. The method of claim 7 wherein the corrosion inhibitor is a volatile corrosion inhibitor product.

10. The method of claim 7 wherein the blower is connected to the second vent so that the fog of corrosion inhibitor is drawn into the turbine through the first vent.

11. The method of claim 7 wherein the step of introducing the fog of corrosion inhibitor into the first vent is performed until the fog of corrosion inhibitor appears at the second vent.

12. The method of claim 7 wherein the step of introducing the fog of corrosion inhibitor into the first vent is performed until the corrosion inhibitor coats substantially all exposed surfaces of the components inside the turbine.

13. The method of claim 7 further comprising providing a tarp covering the blower and the first vent so that the corrosion inhibitor is forced into the first vent while the blower is operating.

14. The method of claim 7 further comprising providing a pipe connected between the blower and the second vent so that the corrosion inhibitor is drawn into the first vent while the blower is operating.

15. The method of claim 7 further comprising providing a tarp covering the blower and the first vent so that the corrosion inhibitor is forced into the first vent while the blower is operating.

16. The method of claim 7 wherein the covers are made from a material selected from the group consisting of plastic, metal and tape.

17. The method of claim 7 wherein the covers are made from a combination of materials selected from the group consisting of plastic, metal and tape.

18. A method of applying a corrosion inhibitor to the interior component parts of a turbine to provide corrosion protection to the components, the method comprising the steps of:
   providing a blower connected to the turbine for forcing or drawing air into the turbine's interior,
   providing at least one inlet vent in the turbine for introducing air into the turbine's interior,
   providing a volume of corrosion inhibitor in a pressurized container that is connected to the at least one inlet vent,
   providing at least one outlet vent in the turbine at the opposite end of turbine from the at least one inlet vent for exhausting air from the turbine's interior,
   introducing a fog of the corrosion inhibitor into the air entering the at least one inlet vent while the blower is operating so that the corrosion inhibitor is caused to be drawn into and through the interior of the turbine to coat the interior component parts of the turbine,
   continuing to introduce the corrosion inhibitor into the at least one inlet vent until the fog of corrosion inhibitor appears at the at least one outlet vent, and subsequently sealing all openings in the turbine with a plurality covers to contain the corrosion inhibitor inside the turbine.

19. The method of claim 18 wherein the corrosion inhibitor is a volatile corrosion inhibitor product.

20. The method of claim 18 wherein the blower is connected to the outlet vent so that the fog of corrosion inhibitor is drawn into the turbine through the first vent.

21. The method of claim 18 wherein the step of introducing the fog of corrosion inhibitor into the inlet vent is performed until the fog of corrosion inhibitor appears at the outlet vent.

22. The method of claim 18 wherein the step of introducing the fog of corrosion inhibitor into the inlet vent is performed until the corrosion inhibitor coats substantially all exposed surfaces of the components inside the turbine.

23. The method of claim 18 further comprising providing a tarp covering the blower and the inlet vent so that the corrosion inhibitor is forced into the inlet vent while the blower is operating.

24. The method of claim 23 further comprising providing a pipe connected between the blower and the tarp so that the corrosion inhibitor is forced into the inlet vent while the blower is operating.

25. The method of claim 18 further comprising providing a tarp covering the blower and the inlet vent, and a pipe connected between the blower and the outlet vent so that the corrosion inhibitor is drawn into the inlet vent while the blower is operating.

26. The method of claim 18 wherein the covers are made from a material selected from the group consisting of plastic, metal and tape.

27. The method of claim 18 wherein the covers are made from a combination of materials selected from the group consisting of plastic, metal and tape.

* * * * *